(12) United States Patent
Miyachi

(10) Patent No.: US 7,976,928 B2
(45) Date of Patent: Jul. 12, 2011

(54) RESIN MOLDED ARTICLE AND MOLDING METHOD THEREOF

(75) Inventor: Toshiki Miyachi, Hiroshima (JP)

(73) Assignee: Daikyonishikawa Corporation (JP)

( * ) Notice: Subject to any disclaimer, the term of this patent is extended or adjusted under 35 U.S.C. 154(b) by 1135 days.

(21) Appl. No.: 11/658,259

(22) PCT Filed: Apr. 5, 2006

(86) PCT No.: PCT/JP2006/307238
§ 371 (c)(1),
(2), (4) Date: Jan. 24, 2007

(87) PCT Pub. No.: WO2006/134710
PCT Pub. Date: Dec. 21, 2006

(65) Prior Publication Data
US 2008/0311348 A1 Dec. 18, 2008

(30) Foreign Application Priority Data

Jun. 16, 2005 (JP) ................................. 2005-176145

(51) Int. Cl.
*B32B 1/04* (2006.01)
*B32B 3/24* (2006.01)
(52) U.S. Cl. ........ 428/131; 428/156; 428/158; 264/45.2
(58) Field of Classification Search ................... 428/131, 428/156, 158; 264/45.2
See application file for complete search history.

(56) References Cited

U.S. PATENT DOCUMENTS

| | | | | |
|---|---|---|---|---|
| 4,446,185 A * | 5/1984 | Waragai et al. | ................. | 428/67 |
| 5,437,750 A * | 8/1995 | Rinse et al. | ................. | 156/73.1 |
| 6,488,871 B2 * | 12/2002 | Nomura et al. | ................. | 264/6 |
| 7,223,458 B2 * | 5/2007 | Tango | ................. | 428/131 |

FOREIGN PATENT DOCUMENTS

| | | |
|---|---|---|
| FR | 2796674 A | 1/2001 |
| JP | 57-150554 | 9/1982 |
| JP | 11-156881 | 6/1999 |
| JP | 11-179751 | 7/1999 |
| JP | 2005-138805 | 6/2005 |
| WO | WO 2004092597 A1 * | 10/2004 |

OTHER PUBLICATIONS

European Search Report dated Jun. 17, 2009; Application No./Patent No. 06731186.0-1253/1908566 PCT/JP2006307238.

* cited by examiner

*Primary Examiner* — William P Watkins, III
(74) *Attorney, Agent, or Firm* — Studebaker & Brackett PC; Donald R. Studebaker

(57) ABSTRACT

An annular mount base 11 continuously protruded from one face of a panel main body 3 and surrounding a through hole 9 has a dual structure of an inner mount base portion 17 and an outer mount base portion 19 which are joined to each other by four parts of a joint mount base portion 21. A skin layer 23 is formed at the surface of a door inner panel 1. An expanded layer 25 with a large number of pores is formed inside the panel main body 3. The mount base 11 and a part of the panel main body 3 between the inner mount base portion 17 and the outer mount base portion 19 are formed of a solid layer 27 having no expanded layer 25. Whereby, a lightweight resin molded article including a high-rigidity mount base is provided.

5 Claims, 16 Drawing Sheets

RESIN MOLDED ARTICLE AND MOLDING METHOD THEREOF

TECHNICAL FIELD

The present invention relates to an improvement on a resin molded article which has a molded main body from which a mount base is protruded continuously, at the surface of which a hard skin layer with no pore is formed, and inside which an expanded layer with a large number of pores is formed, and on a molding method thereof.

BACKGROUND ART

In Patent Document 1, a resin molded article at the entire surface of which a hard skin layer with no pore is formed and inside which an expanded layer with a large number of pores is formed is obtained in such a manner that: a fiber-containing thermoplastic resin is injected and filled in a cavity of a mold, which includes a fixed die having a molding face in which a concave portion is formed and a movable die including a sliding die, with the mold closed; and in the process of solidifying the fiber-containing thermoplastic resin in the cavity, the sliding die in the movable die is withdrawn in the direction in which the capacity of the cavity is increased to expand the fiber-containing thermoplastic resin by elastic restoring force (a springback phenomenon) of the fiber compressed by resin pressure. This resin molded article, which includes the expanded layer, is lightweight. Patent Document 1: Japanese Patent Application Laid Open Publication No. 11-179751A (Pages 3 and 7 and FIG. 1)

SUMMARY OF THE INVENTION

The expanded layer, which can promote weight reduction, however, invites lowering of rigidity. Therefore, when a resin molded article including a mount base continuously protruded from a molded main body is formed by the method according to Patent Document 1, the rigidity of the mount base is lowered, with a result that the mount base may be broken or deformed upon receipt of large fastening force of a fastening jig in mounting the resin molded article to a target member.

The present invention has been made in view of the foregoing and has its object of providing a lightweight resin molded article including a high-rigidity mount base.

Means for Solving the Problems

To attain the above object, the present invention devises the structure of the mount base.

Specifically, the inventions according to Claims 1 to 3 are directed to a resin molded article in a panel shape including a hard skin layer with no pore at a surface thereof and an expanded layer with a large number of pores inside thereof, the hard skin layer and the expanded layer being formed by expanding, in the process of solidifying a fiber-containing thermoplastic resin injected and filled in a cavity of a mold, the fiber-containing thermoplastic resin by increasing a capacity of the cavity, wherein the following features are provided.

Namely, in the invention according to Claim 1, there are provided: a molded main body in which a through hole is formed; and an annular mount base continuously protruded from at least one face of the molded main body around the periphery of the through hole so as to surround the through hole, wherein the mount base includes an inner mount base portion including an inner peripheral face of the through hole, an outer mount base portion provided so as to surround the inner mount base portion outside the inner mount base portion with a space left, and a joint mount base portion having a plurality of parts for joining the inner mount base portion and the outer mount base portion, and the mount base and a part of the molded main body between the inner mount base portion and the outer mount base portion are formed of a solid layer having no expanded layer.

Referring to the invention according to Claim 2, in the invention according to Claim 1, another mount base is provided so that the mount bases are protruded from respective faces of the molded main body with the respective inner mount base portions and the respective outer mount base portions opposed to each other.

Referring to the invention according to Claim 3, in the invention according to Claim 1 or 2, a solid layer having a predetermined width and having no expanded layer is formed at a part of the molded main body around the outer periphery of each mount base.

The inventions according to Claims 4 and 5 are directed to a resin molded article in a panel shape including a hard skin layer with no pore at a surface thereof and an expanded layer with a large number of pores inside thereof, the hard skin layer and the expanded layer being formed by expanding, in the process of solidifying a fiber-containing thermoplastic resin injected and filled in a cavity of a mold, the fiber-containing thermoplastic resin by increasing a capacity of the cavity, wherein the following features are provided.

Namely, in the invention according to Claim 4, there are provided: a molded main body in which a through hole is formed; and an annular mount base continuously protruded from at least one face of the molded main body around the periphery of the through hole so as to surround the through hole, wherein the mount base includes an inner mount base portion including an inner peripheral face of the through hole, an outer mount base portion provided so as to surround the inner mount base portion outside the inner mount base portion with a space left, and a joint mount base portion having a plurality of parts for joining the inner mount base portion and the outer mount base portion, and the skin layer at the mount base has a thickness larger than the skin layer at the molded main body.

Referring to the invention according to Claim 5, in the invention according to Claim 4, another mount base is provided so that the mount bases protruded from respective faces of the molded main body with the respective inner mount base portions and the respective outer mount base portions not overlapped with each other when viewed in plan.

The invention also is directed to a method for molding a resin molded article according to Claim 4 or 5, which includes the steps of: preparing a mold including a fixed die and a movable die, in at least one of which a concave portion corresponding to each mount base of the resin molded article is formed and in one of which a convex portion corresponding to a through hole of the resin molded article is formed; and injecting and filling a fiber-containing thermoplastic resin into a cavity with the mold closed, and obtaining the resin molded article by expanding the fiber-containing thermoplastic resin by withdrawing and moving the movable die in a direction in which the capacity of the cavity is increased in the process of solidifying the fiber-containing thermoplastic resin in the cavity, the obtained resin molded article having at an entire surface thereof a hard skin layer with no pore and at the inside thereof an expansion layer with a large number of pores, and the skin layer at each mount base having a thickness larger than the skin layer at a molded main body.

EFFECTS OF THE INVENTION

In the invention according to Claim 1, the hard skin layer with no pore is formed at the surface of the resin molded article while a large number of pores are formed inside the molded main body, thereby contemplating a lightweight resin molded article. Further, the mount base and a part of the molded main body between the inner mount base portion and the outer mount base portion are formed of a solid layer having no expanded layer, thereby increasing the rigidity of the mount base. Moreover, the inner mount base portion and the outer mount base portion are joined by the plural parts of the joint mount base portion, thereby increasing the rigidity of the inner and outer mount base portions in the radial direction of the through hole to increase the rigidity of the mount base as a whole further and to prevent the inner and outer mount base portions from being deformed or broken even upon receipt of large fastening force of a fastening jig.

In the invention according to Claim 2, the mount bases are protruded continuously from the respective face of the molded main body so that at least the respective inner mount base portions and the respective outer mount base portion are opposed to each other, so that the thickness in total of the solid layers forming the mount bases increases double, further increasing the rigidity of the mount bases.

In the invention according to claim 3, with the solid layer surrounding each mount base, the rigidity of the molded main body around the outer periphery of each mount base increases.

In the inventions according to claim 4, the hard skin layer with no pore is formed at the entire surface of the resin molded article while a large number of pores are formed inside the molded main body, thereby contemplating a lightweight resin molded article. Each mount base has at least a dual structure of the inner mount base portion and the outer mount base portion to increase a contact area with the mold, thereby being cooled faster. Further, the mount base portions, each of which has a small width, hardly receive influence of expansion of the fiber-reinforce thermoplastic resin accompanied by the capacity increase, so that the skin layer at each mount base is formed thicker than the skin layer at the molded main body. Moreover, the inner mount base portion and the outer mount base portion are joined to each other by the plural parts of the joint mount base portion, thereby increasing the rigidity of the inner and outer mount base portions in the radial direction of the through hole to increase the rigidity of each mount base as a whole and to prevent the inner and outer mount base portions from being deformed or broken even upon receipt of large fastening force of a fastening jig. Furthermore, protrusion of the mount bases from the respective faces of the molded main body increases double the thickness in total of the skin layers of the mount bases, thereby further increasing the rigidity of the mount bases. Particularly, in the invention according to Claim 5, the joint mount base portions provided at the respective faces of the molded main body do not overlap with each other as viewed in plan to increase parts that receive the fastening force of the fastening jig, thereby increasing the rigidity of the mount bases further.

Figure 1:
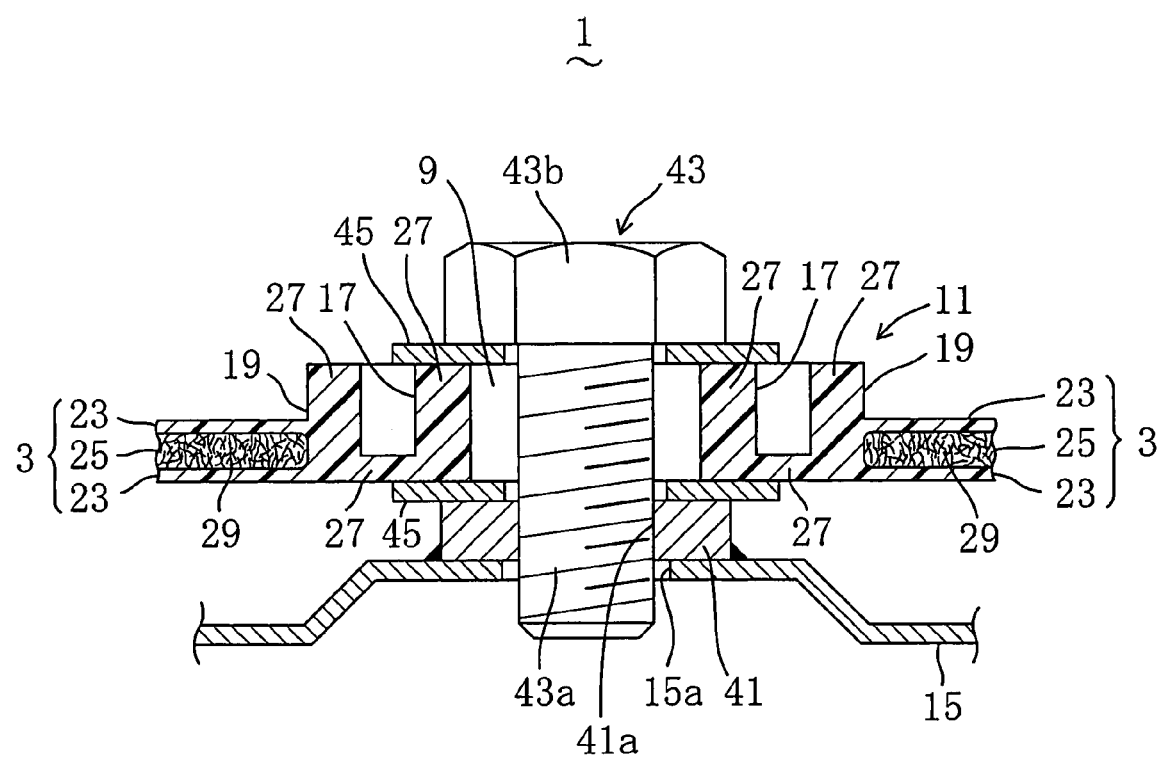
FIG. 1 is a sectional view taken along the line I-I in FIG. 2 for showing a mount base in the state where a door inner panel is mounted to a panel member.

EXPLANATION OF REFERENCE NUMERALS 1 door inner panel (resin molded article)
3 door inner panel main body (molded main body)
9 through hole
11 mount base
17 inner mount base portion
19 outer mount base portion
21 joint mount base portion
23 skin layer
25 expanded layer
27 solid layer
29 fiber
31 first die
31a convex portion corresponding to through hole of door inner panel (resin molded article)
33 second die
33a, 33b concave portion corresponding to mount base
35a, 35b concave portion corresponding to mount base
37 mold
39 cavity
R fiber-containing thermoplastic resin
t1 thickness of skin layer at mount base
t2 thickness of skin layer at panel main body

BEST MODE FOR CARRYING OUT THE INVENTION

Embodiments of the present invention will be described below with reference to the drawings.

Embodiment 1

Figure 3:
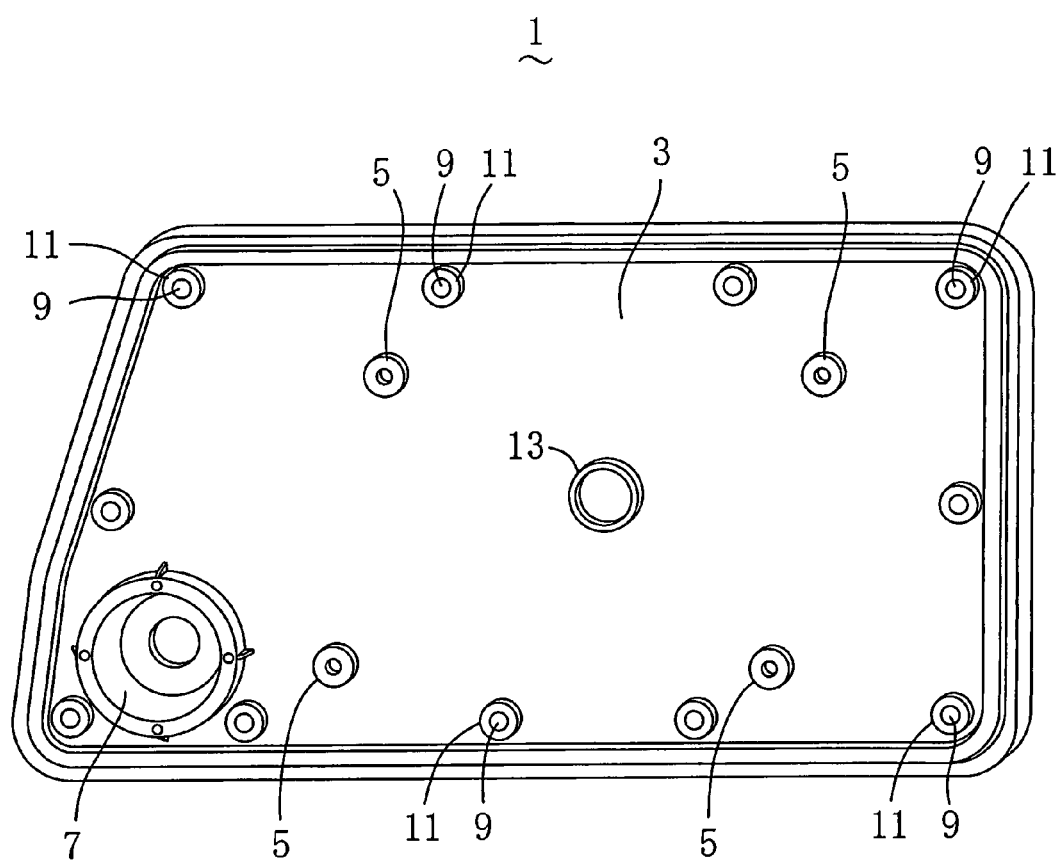
FIG. 3 is a perspective view of the door inner panel according to Embodiment 1 when viewed from the inside of a cabin.

FIG. 3 is a perspective view of a resin-made door inner panel (door module) 1 forming a part of a side door for an automobile as a resin molded article according to Embodiment 1 of the present invention when viewed from the inside of a cabin. The door inner panel 1 includes a door inner panel main body (hereinafter referred to as panel main body) 3 as a molded main body, which has an inboard face from which four cylindrical mount bases 5 for mounting a window glass elevating rail (not shown) are protruded continuously. A speaker housing portion 7 in the form of a round flower pot is protruded continuously from the outboard face of the panel main body 3 at the left lower corner in FIG. 3. A plurality of through holes are formed at regular intervals in the peripheral part of the panel main body 3 along the entire periphery thereof, and an annular mount base 11 is protruded around the periphery of each through hole 9 continuously from the inboard face of the panel main body 3 so as to surround the through hole 9. In FIG. 3, reference numeral 13 denotes a part where a window glass elevating motor is to be mounted.

Figure 2:
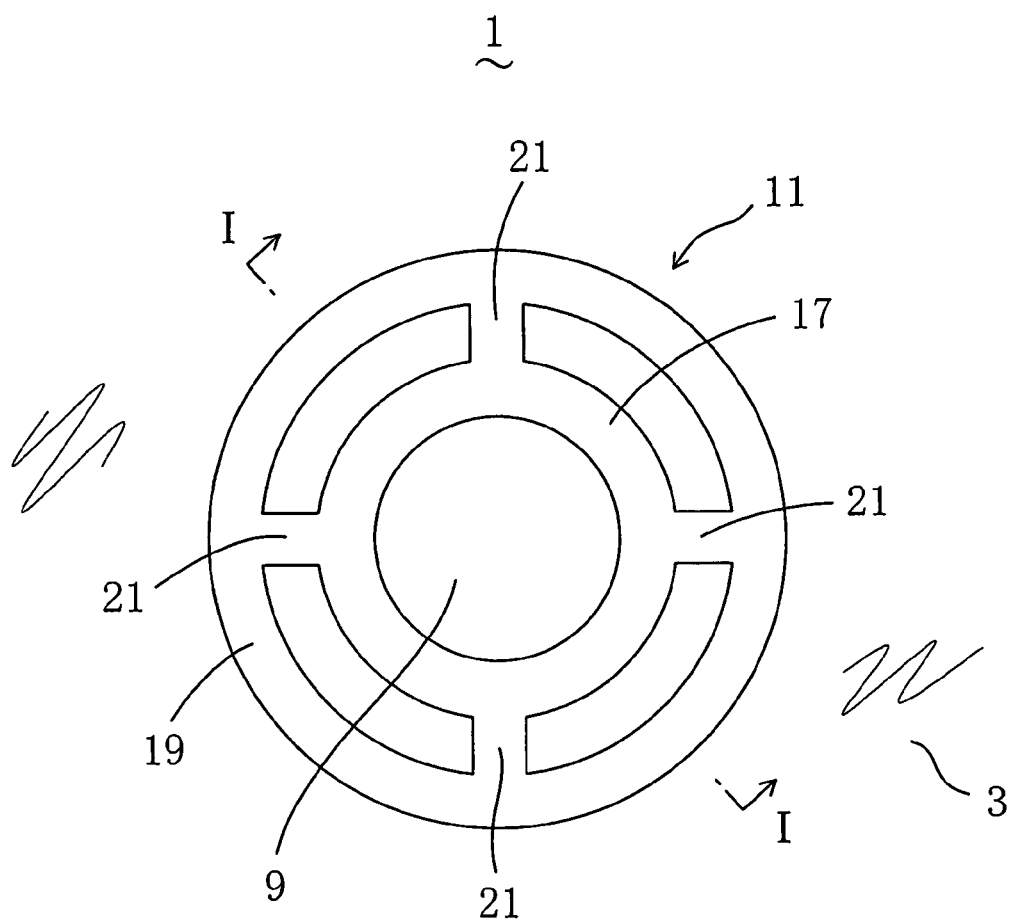
FIG. 2 is an enlarged plan view of the mount base of the door inner panel according to Embodiment 1.

FIG. 2 is an enlarged plan view of the aforementioned mount base 11, and FIG. 1 is an enlarged vertical sectional view of the mount base 11 in the state where the door inner panel 1 is mounted to a door inner panel mounting panel member 15 fixed to a door outer panel (not shown). The mount base 11 includes: an inner mount base portion 17 continuously protruded from the inboard face of the panel main body 3 so as to surround the through hole 9 around the periphery of the through hole 9 and including an inner peripheral face of the through hole 9; an outer mount base portion 19 protruded continuously therefrom and coaxially with the inner mount base portion 19 so as to surround the inner mount base portion 17 with a space left outside the inner mount base portion 17; and a joint mount base portion 21 having four parts for joining the inner mount base portion 17 and the outer mount base portion 19 in the radial direction. The inner mount base portion 17, the outer mount base portion 19, and the joint mount base portion 21 have the same protruded height so as to be aligned in height. Each of the mount base portions 17, 19, 21 is not shown in the mount bases 11 in FIG. 3 for the convenience sake of paper. In the door inner panel 1, a hard skin layer 23 with no pore is formed at the surface thereof while an expanded layer 25 with a large number of pores (not shown) is formed thereinside. Each mount base 11 and each part of the panel main body 3 between the inner mount base portions 17 and the outer mount base portions 19 are formed of a solid layer 27 having no expanded layer 25. The door inner panel 1 having the above structure is molded, as will be described later in detail, in such a manner that in the process of solidifying a fiber-containing thermoplastic resin R injected and filled in a cavity 39 of a mold 37, the cavity capacity is increased to cause elastic restoring force of the fiber for expanding the fiber-containing thermoplastic resin R. In FIG. 1, the reference numeral 29 denotes an elastically restored fiber.

The door inner panel 1 including the above mount bases 11 is molded in the following manner.

Figure 4:
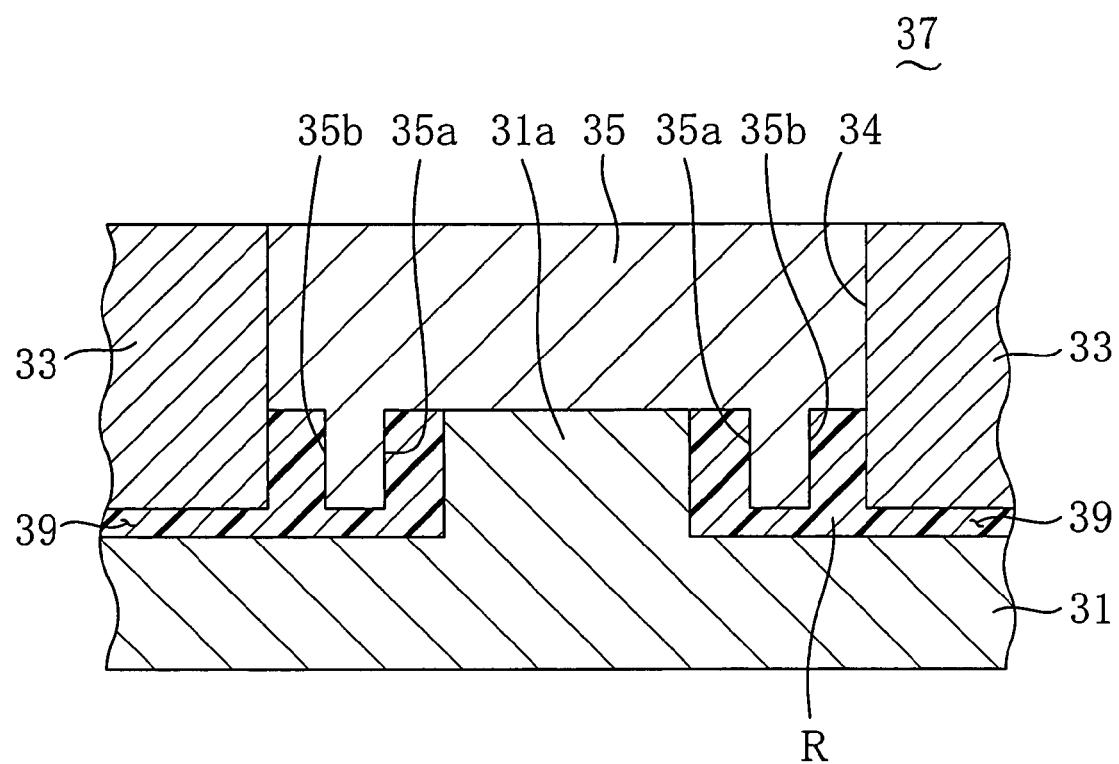
FIG. 4 is a view illustrating a molding step at a part corresponding to the section taken along the line I-I in FIG. 2 and shows the state where a fiber-containing thermoplastic resin is injected and filled in a cavity of a mold in Embodiment 1.

For molding, the die 37 is prepared which includes, as shown in FIG. 4, a first die 31 as a fixed die, a second die 33 as a movable die arranged opposite the first die 31, and a pressure block 35 movably inserted in an insertion hole 34 of the second die 33 and urged by urging means (not shown), such as spring or the like, so as to protrude toward the first die 31. FIG. 4 shows a part of the mold 37 which corresponds to the section taken along the line I-I in FIG. 2. A column-shaped convex portion 31a corresponding to a through hole 9 of the door inner panel 1 is formed in the first die 31. In the pressure block 35, there are formed an annular concave portion 35a corresponding to an inner mount base portion 17 of a mount base 11 of the door inner panel 1, an annular concave portion 35b corresponding to an outer mount base portion 19 thereof, and a concave portion corresponding to a joint mount base portion 21 (not shown).

Figure 5:
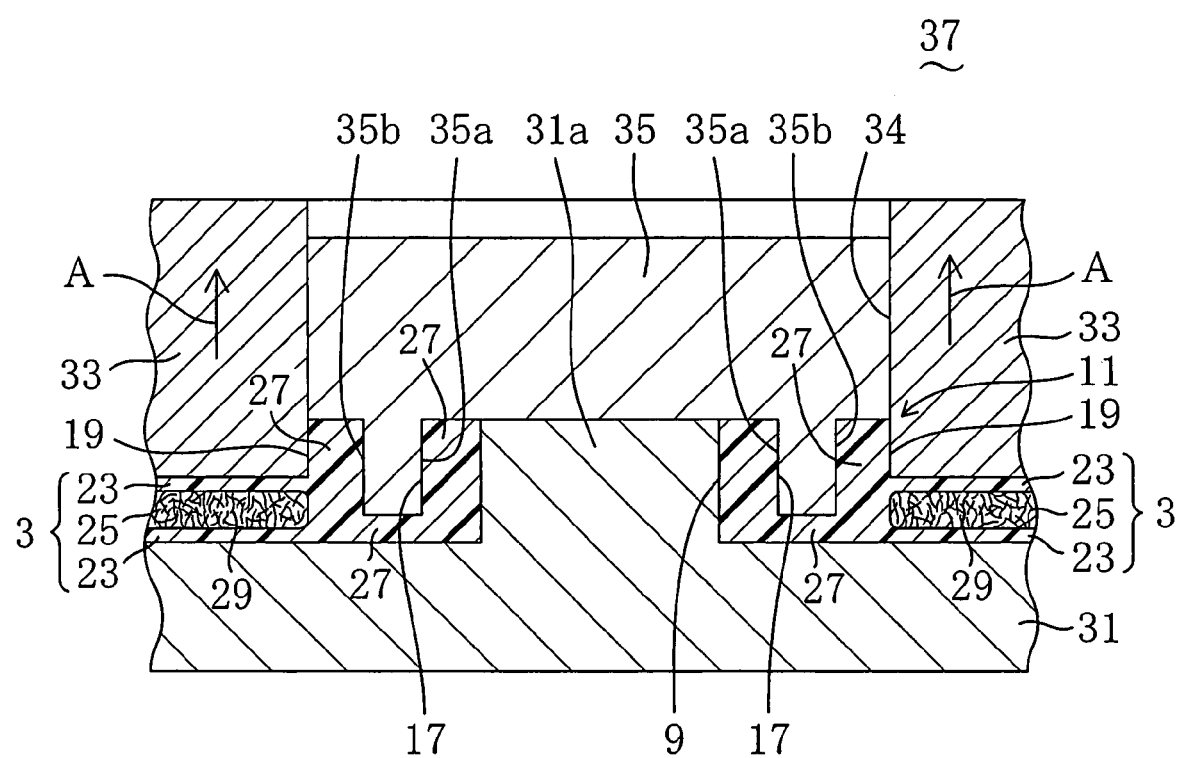
FIG. 5 is a view illustrating a molding step at a part corresponding to the section taken along the line I-I in FIG. 2 and shows the state where the door inner panel is formed by slightly withdrawing and moving a second die in a direction in which a cavity capacity is increased in Embodiment 1.

First, as shown in FIG. 4, the fiber-reinforce thermoplastic resin R to which a glass fiber or the like is added is injected and filled by an injection machine (not shown) into the cavity 39 with the mold 37 closed. Subsequently, in the process of solidifying the fiber-containing thermoplastic resin R in the cavity 39 of the mold 37, the second die 33 is withdrawn and moved in the direction A in which the cavity capacity is increased, as shown in FIG. 5. In detail, the second die 33 is moved slightly away from the first die 31 to increase, for example, double or more the cavity capacity outside the pressure block 35. A part of the fiber-containing thermoplastic resin R which is in contact with the molding face of the mold 37 is cooled faster due to influence of the temperature of the mold to form the dense skin layer 23 serving as a surface layer. On the other hand, the inner part of the fiber-containing thermoplastic resin R, which hardly receives the influence of the temperature of the mold, is in a gel state having high viscosity. Accordingly, the increase in cavity capacity releases the fiber 29, which has been compressed by the first die 31 and the second die 33, from the pressure to restore the fiber 29 elastically, so that the fiber-containing thermoplastic resin R is expanded by the elastic restoring force (springback phenomenon). Thus, the door inner panel 1 is obtained which includes the hard skin layer 23 with no pore at the surface thereof and the expanded layer 25 with a large number of pores (not shown) inside the panel main body 3 except the mount bases 11 and the parts of the panel main body 3 between the inner mount base portions 17 and the outer mount base portions 19. Hence, reduction in weight of the door inner panel 1 is contemplated when compared with a door inner panel of which panel main body 3 is formed of only a solid layer having no expanded layer 25 and has the same thickness as the panel main body 3 in the present embodiment.

While the second die 33 is withdrawn and moved, the pressure block 35 is not withdrawn with the urging force applied toward the first die 31, so that the cavity capacity at parts corresponding to the mount bases 11 and the parts of the panel main body 3 between the inner mount base portions 17 and the outer mount base portions 19 is not increased in molding. Therefore, the elastic restoring force of the fiber 29 in the fiber-containing thermoplastic resin R is suppressed, with a result that the hard solid layer 27 with no pore is formed at the resultant mount bases 11 and parts of the panel main body 3 where the mount bases 11 are formed (namely, the parts of the panel main body 3 between the inner mount base portions 17 and the outer mount base portions 19), thereby increasing the rigidity of the mount bases 11. A slight amount of the fiber-containing thermoplastic resin R would flow out from a part of the cavity 39 which corresponds to the annular concave portion 35b of the pressure block 35 to a part thereof which is expanded by the withdrawal of the second die 33, which involves no adverse influence in forming the solid layer 27.

Each mount base 11 having a dual structure of the inner mount base portions 17 and the outer mount base portion 19 joined by the four parts of the joint mount base portion 21 is protruded continuously from the inboard face of the panel main body 3 of the thus molded door inner panel 1. The through holes 9 are formed so as to be surrounded by the inner mount base portions 17.

The thus molded inner panel 1 is mounted to the metal panel member 15, as shown in FIG. 1, by screwing and fastening axial parts 43a of bolts 43 inserted through the through holes 9 into welded nuts 41 welded around bolt insertion holes 15a of the panel member 15 so that screw holes 41a of the welded nuts 41 correspond to the bolt insertion holes 15a. Washers 45 are interposed between each welded nut 41 and the door inner panel 1 and between each inner mount base portion 17 and a head portion 43b of each bolt 43. Each mount base 11 is formed of the inner mount base portion 17 and the outer mount base portion 19 joined to each other by the four parts of the joint mount base portion 21 so that the fastening force of the bolts 43, which works on the inner mount base portion 17 in screwing, works also on the outer mount base portion 19 via the joint mount base portion 21, and the mount bases 11 and the parts of the panel main body 3 between the inner mount base portions 17 and the outer mount base portions 19 of the mount bases 11 are formed of the solid layer 27 having no expanded layer 25, with a result that the rigidity of the mount bases 11 increases. Hence, in the present embodiment, the inner mount base portions 17 are prevented from being deformed and broken.

Embodiment 2

Figure 6:
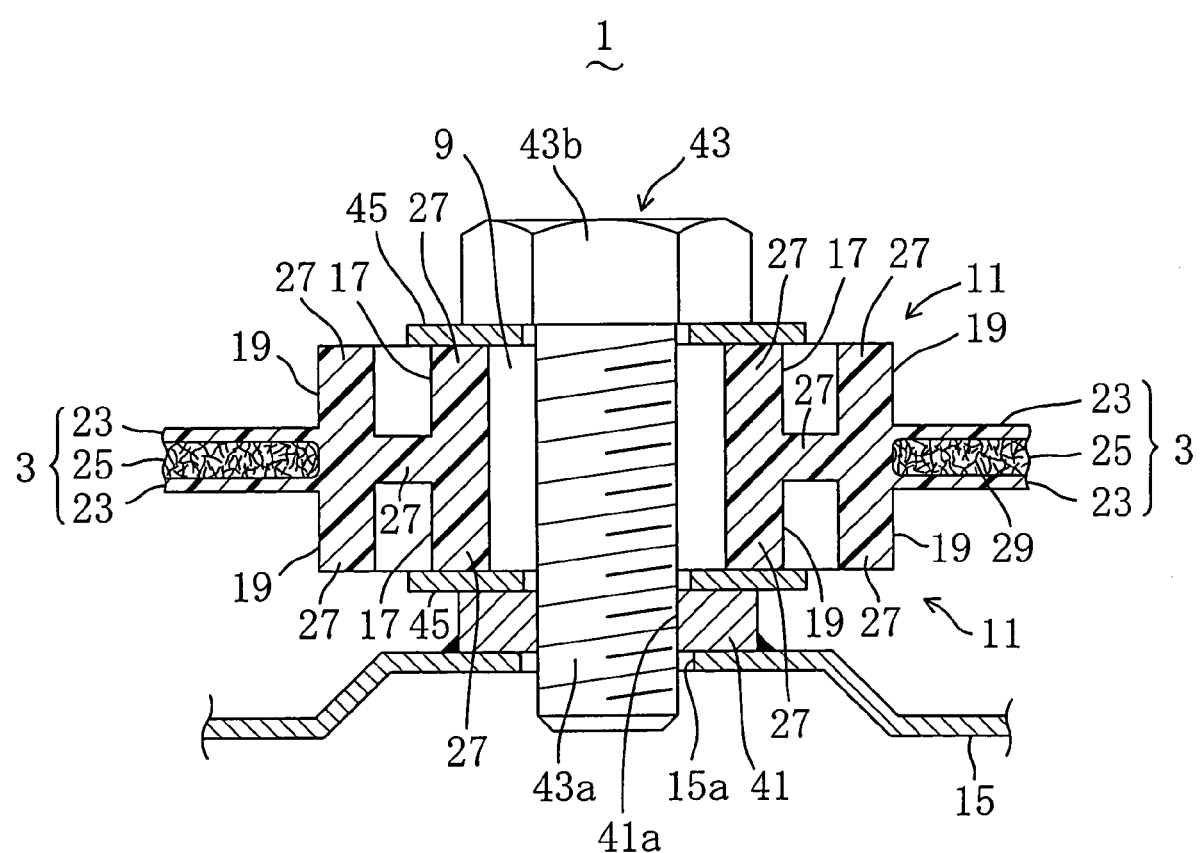
FIG. 6 is a view corresponding to FIG. 1 in Embodiment 2.
Figure 7:
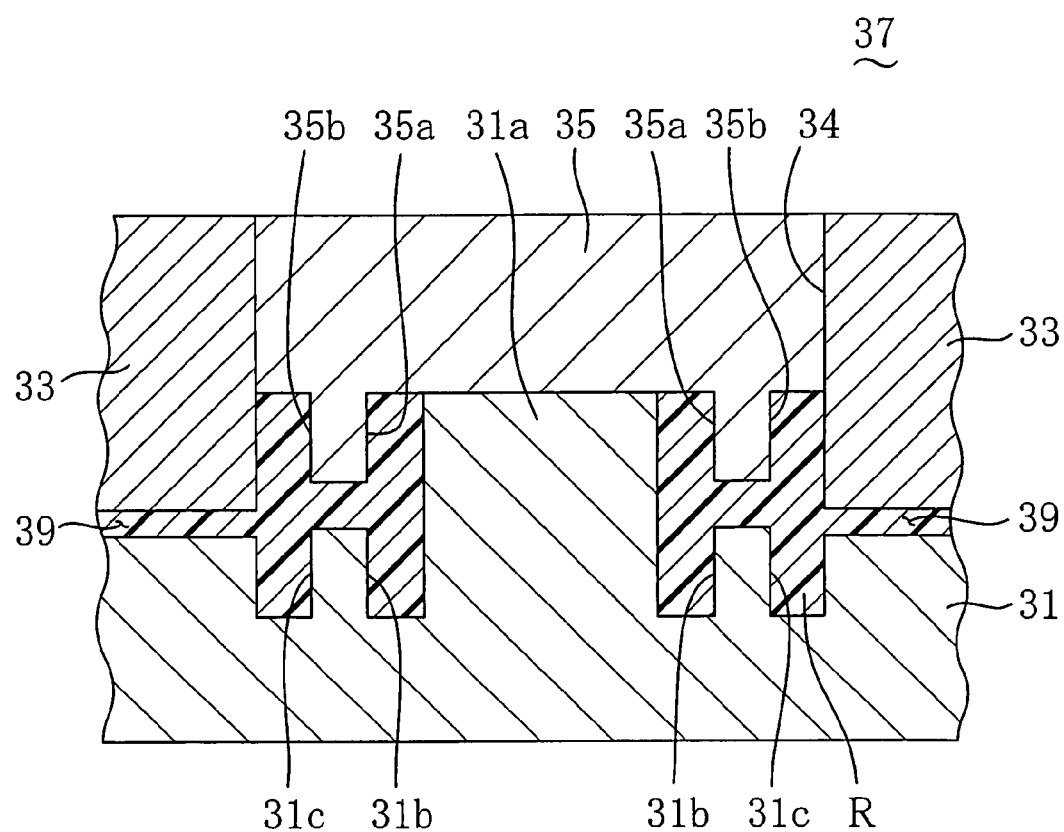
FIG. 7 is a view corresponding to FIG. 4 in Embodiment 2.
Figure 8:
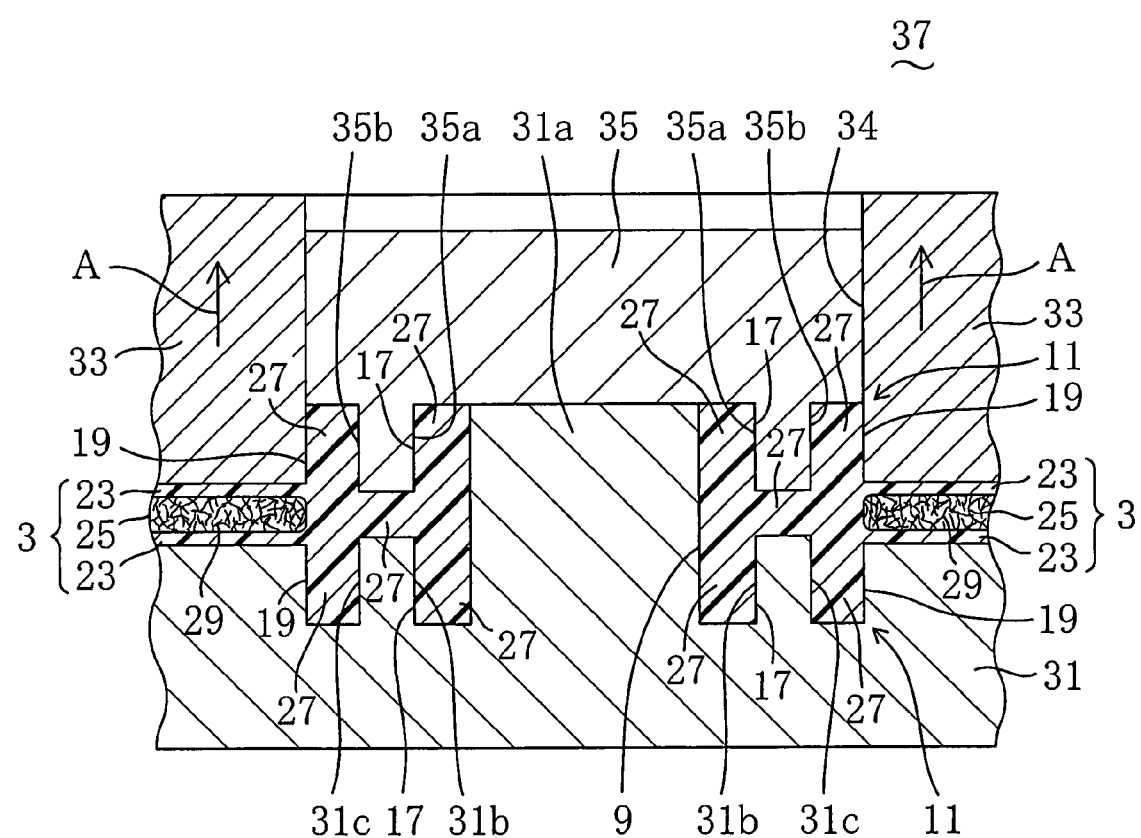
FIG. 8 is a view corresponding to FIG. 5 in Embodiment 2.

FIG. 6, which corresponds to FIG. 1, shows a door inner panel 1 as a resin molded article according to Embodiment 2, and FIG. 7 and FIG. 8 show molding steps corresponding to those of FIG. 4 and FIG. 5, respectively.

In Embodiment 2, mount bases 11 are protruded continuously from the respective faces of a panel main body 3 so that respective mount base portions 17, 19 are opposed to each other and are overlapped with each other when viewed in plan, wherein the mount bases 11 share a through hole 9.

Referring to a mold 37 used in Embodiment 2, concave portions 31b, 31c are formed in a first die 33 so as to be opposed to concave portions 35a, 35b of the pressure block 35, similarly to the pressure block 35, so as to correspond to the mount bases 11 opposed to each other and protruded from the respective faces of the panel main body 3.

The other part has the same structure as that in Embodiment 1, and therefore, detailed description thereof is omitted with the same reference numerals assigned to the same constitutional elements. Description of a molding method thereof is also omitted.

Hence, the same effects as in Embodiment 1 can be obtained in Embodiment 2.

In addition, in Embodiment 2, the mount bases 11 are opposed to each other and protrudes from the respective faces of the panel main body 3 so that the respective inner mount base portions 17, the respective outer mount base portions 19, and the respective joint mount base portions 21 are all overlapped with each other, increasing double the thickness in total of the solid layers 27 when compared with that in Embodiment 1, with a result that the rigidity of the mount bases 11 increases further.

Embodiment 3

Figure 9:
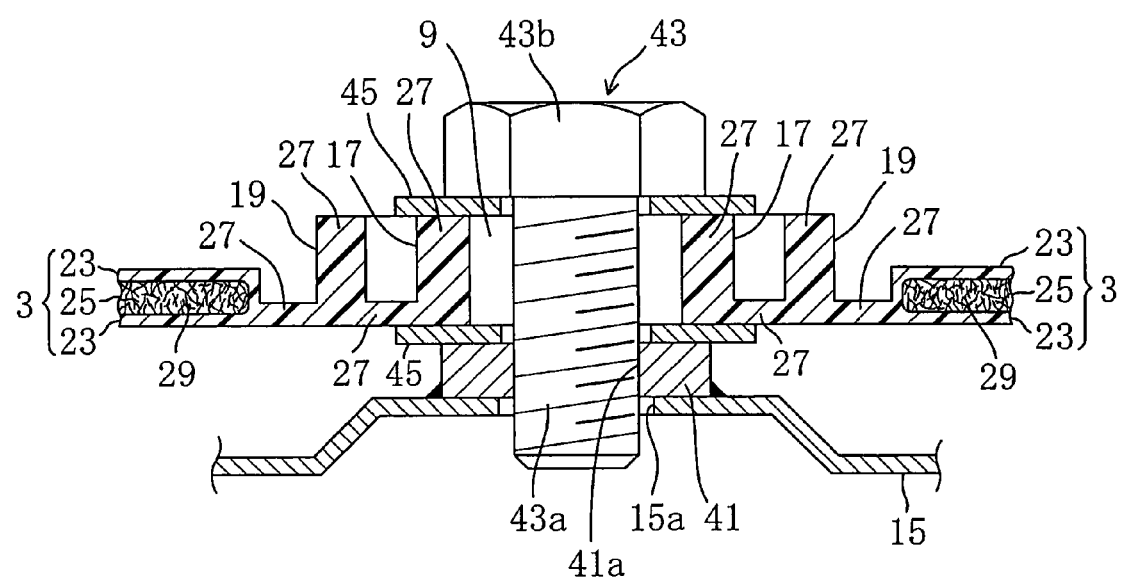
FIG. 9 is a view corresponding to FIG. 1 in Embodiment 3.

FIG. 9, which corresponds to FIG. 1, shows a door inner panel 1 as a resin molded article according to Embodiment 3.

In Embodiment 3, a solid layer 27 having a predetermined width and having no expanded layer 25 is formed at a part of a panel main body 3 around the outer periphery of each mount base 11 continuously from each mount base 11 so as to surround the outer periphery of the mount base 11. Correspondingly, a ring-shaped convex portion is formed outside a concave portion 35b in a pressure block 35 of a mold 37.

The other part has the same structure as that in Embodiment 1, and therefore, detailed description thereof is omitted with the same reference numerals assigned to the same constitutional elements. Description of a molding method thereof is also omitted.

Hence, the same effects as in Embodiment 1 can be obtained in Embodiment 3.

In addition, in Embodiment 3, with the solid layer 27 surrounding each mount base 11, the rigidity increases at a part around the outer periphery of each mount base 11 of the panel main body 3.

Embodiment 4

Figure 10:
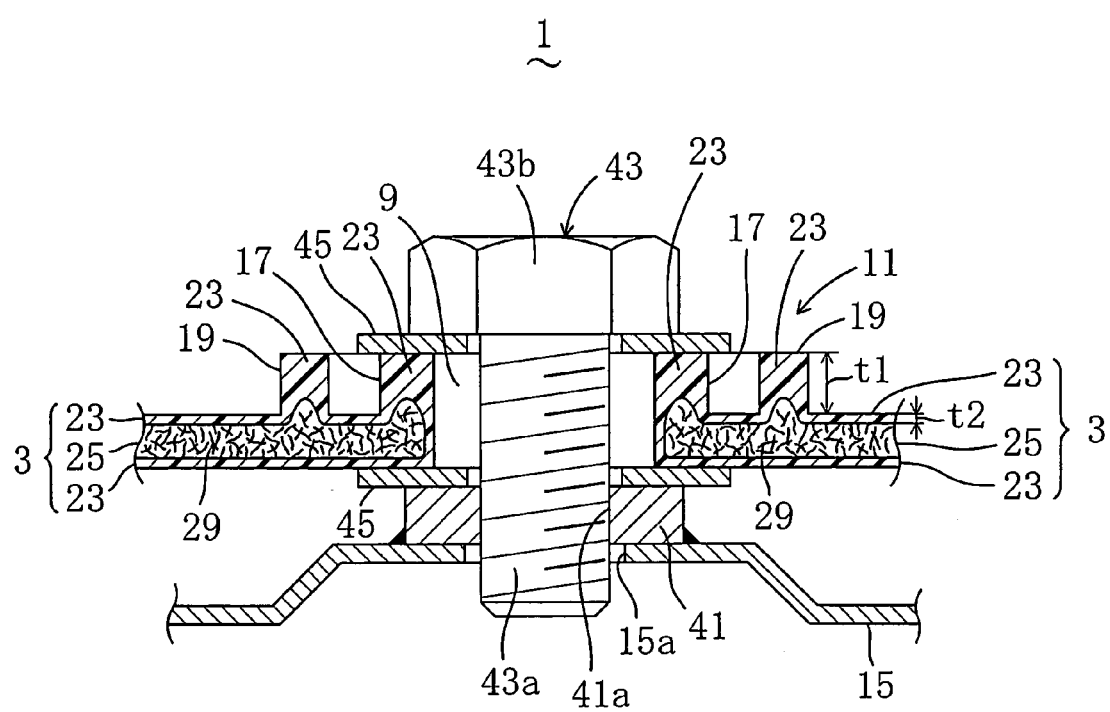
FIG. 10 is a view corresponding to FIG. 1 in Embodiment 4.
Figure 11:
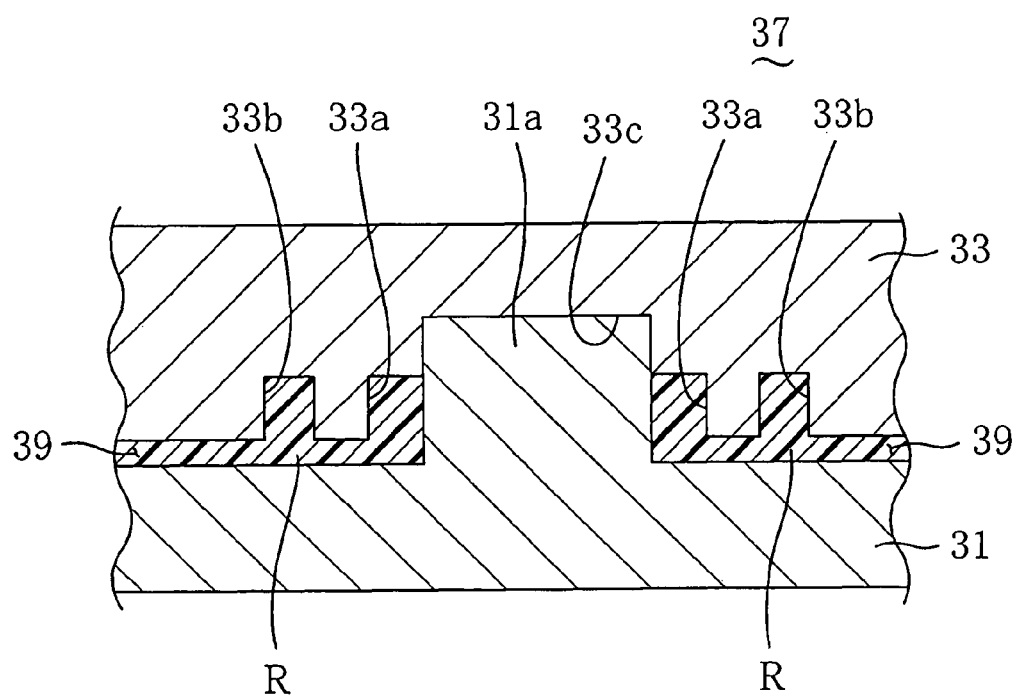
FIG. 11 is a view corresponding to FIG. 4 in Embodiment 4.
Figure 12:
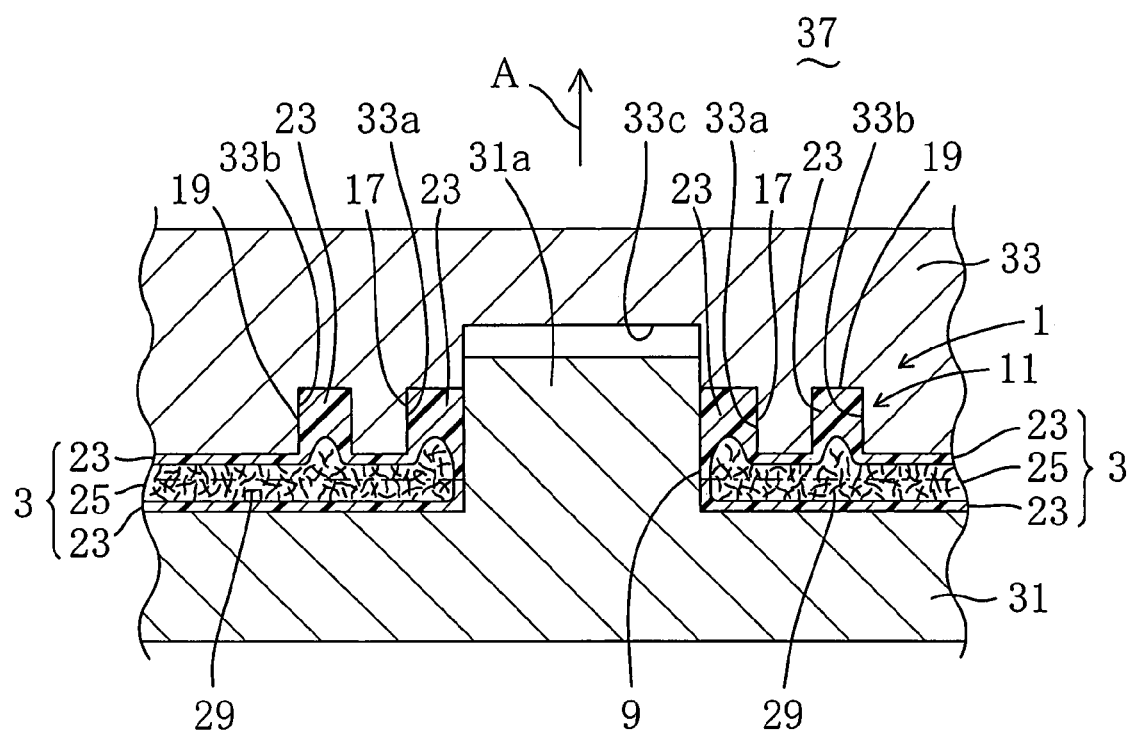
FIG. 12 is a view corresponding to FIG. 5 in Embodiment 4.

FIG. 10, which corresponds to FIG. 1, shows a door inner panel 1 as a resin molded article according to Embodiment 4, and FIG. 11 and FIG. 12 show molding steps corresponding to those of FIG. 4 and FIG. 5, respectively.

In Embodiment 4, a hard skin layer 23 with no pore is formed at the entire surface of the door inner panel 1 while the expanded layer 25 with a large number of pores (not shown) is formed inside thereof. The skin layer 23 and the expanded layer 25 are rather different in their states between at a mount base 11 and a panel main body 3, namely, a thickness t1 of the skin layer 23 at the mount base 11 is larger than a thickness t2 of the skin layer 23 at the panel main body 3. Specifically, at panel main body 3, the skin layer 23 has the small thickness t2 while the expanded layer 25 is dominant. In contrast, at the mount base 11, the skin layer 23 has the large thickness t1 and is dominant while the expanded layer 25 slightly enters into the mount base 11 from the panel main body 3. The door inner panel 1 having the above structure is molded, as will be described later in detail, in such a manner that the cavity capacity of a mold is increased in the process of solidifying a fiber-containing thermoplastic resin injected and filled in the cavity of the mold to cause the elastic restring force of the fiber 29 for expanding the fiber-reinforce thermoplastic resin.

The door inner panel 1 including the above mount bases 11 is molded in the following manner.

FIG. 11 shows a mold 37 corresponding to that of FIG. 4. For molding, as shown in FIG. 11, the mold 37 is prepared which is composed of a first die 31 as a fixed die and a second die 33 as a movable die arranged opposite the first die 31. A cylindrical convex portion 31a corresponding to a through hole 9 of the door inner panel 1 is formed in the first die 31. On the other hand, in the second die 33, there are formed an annular concave portion 33a corresponding to an inner mount base portion 17 of a mount base 11 of the door inner panel 1, an annular concave portion 33b corresponding to an outer mount base portion 19 thereof, a concave portion (not shown) corresponding to a joint mount base portion 21 thereof, and a circular convex portion 33c into which the tip end of the convex portion 31a of the first die 31 is fitted.

First, as shown in FIG. 11, a fiber-containing thermoplastic resin R to which a glass fiber or the like is added is injected from an injection machine (not shown) and is filled in a cavity 39 with the mold 37 closed. Thereafter, as shown in FIG. 12, in the process of solidifying the fiber-containing thermoplastic resin R in the cavity 39 of the mold 37, the second die 33 is withdrawn and moved in the direction A in which the cavity capacity is increased. Namely, the second die 33 is moved slightly away from the first die 31 to increase, for example, double or more the cavity capacity at a part corresponding to the panel main body 3. Accordingly, a part of the fiber-reinforce thermoplastic resin R which is in contact with the molding face of the mold 37 is cooled faster due to influence of the temperature of the mold to form the dense skin layer 23 serving as the surface layer. On the other hand, the inner part of the fiber-containing thermoplastic resin R, which hardly receives the influence of the temperature of the mold, is in a gel state having high viscosity.

Accordingly, the increase in cavity capacity releases the fiber 29 at the inner part of the fiber-containing thermoplastic resin R, which has been compressed by resin pressure, from the resin pressure to restore the fiber 29 elastically, so that the fiber-containing thermoplastic resin R is expanded by the elastic restoring fore (the springback phenomenon). Thus, the door inner panel 1 is obtained which includes the hard skin layer 23 with no pore at the entire surface thereof and the expanded layer 25 with a large number of pores (not shown) inside the panel main body 3. Hence, reduction in weight of the door inner panel 1 is contemplated when compared with the door inner panel of which panel main body 3 is formed of only a solid layer having no expanded layer 25 and has the same thickness as the panel main body 3 in the present embodiment. From the inboard face of the panel main body 3 of the thus molded door inner panel 1, the mount bases 11 are continuously protruded each of which has the dual structure of the inner mount base portion 17 and the outer mount base portion 19 joined to each other by the four parts of the joint mount base portion 21. The through holes 9 are formed so as to be surrounded by the inner mount base portions 17.

Further, each mount base 11, which has the dual structure of the inner mount base portion 17 and the outer mount base portion 19, is increased in contact area with the second die 33, thereby being cooled faster. Furthermore, the mount base portions 17, 19, each of which has a small width, hardly receive the influence of the elastic restoring force (expansion of the fiber-containing thermoplastic resin R) accompanied by the increase in cavity capacity, so that the thickness t1 of the skin layer 23 at each mount base 11 becomes larger than the thickness t2 of the skin layer 23 at the panel main body 3.

The thus molded door inner panel 1 is mounted to a panel member 15, similarly to Embodiment 1 (see FIG. 10). In mounting, in each mount base 11, in which the inner mount base portion 17 and the outer mount base portion 19 are joined to each other by the four parts of the joint mount base 21, the fastening force of a bolt 43, which works on the inner mount base portion 17, works also on the outer mount base portion 19 via the joint mount base portion 21, thereby increasing the rigidity of the mount base 11 in combination with the increase in thickness of the skin layer 23 at the mount base 11. Hence, in the present embodiment, the inner mount base portions 17 are prevented from being deformed and broken.

Embodiment 5

Figure 13:
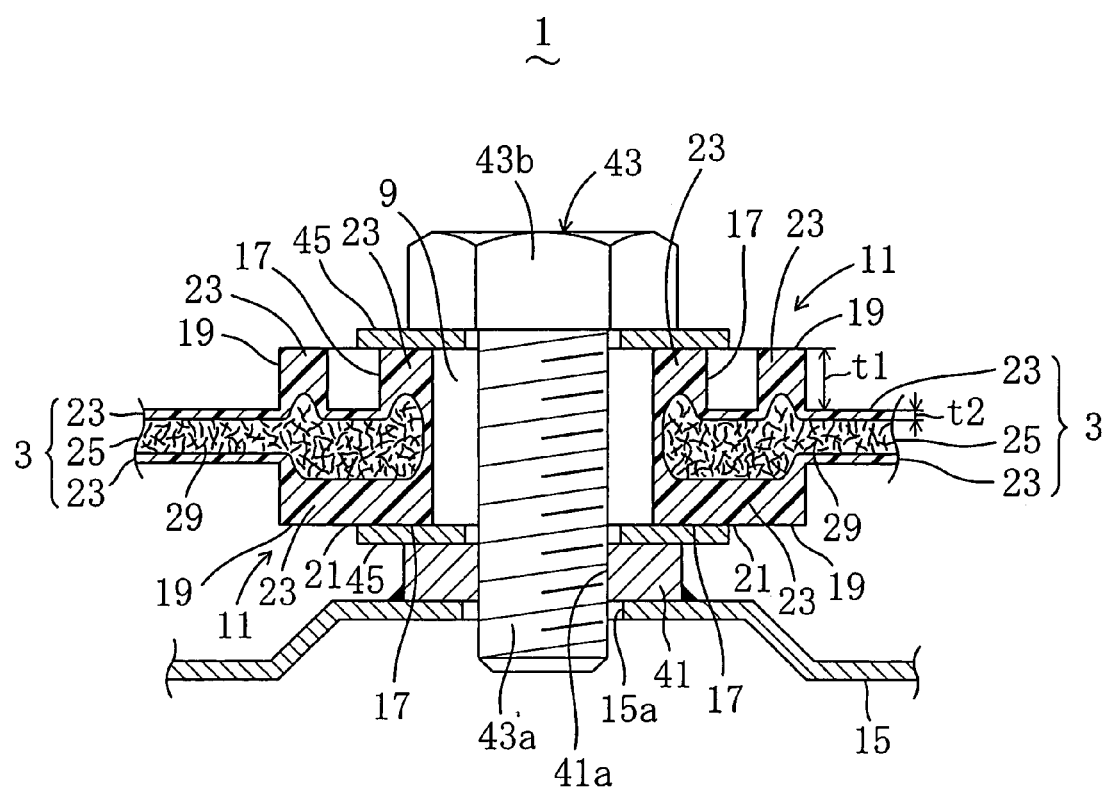
FIG. 13 is a sectional view (corresponding to FIG. 1) taken along the line XIII-XIII in FIG. 14 and shows the mount base in the state where the door inner panel is mounted to the panel member.
Figure 14:
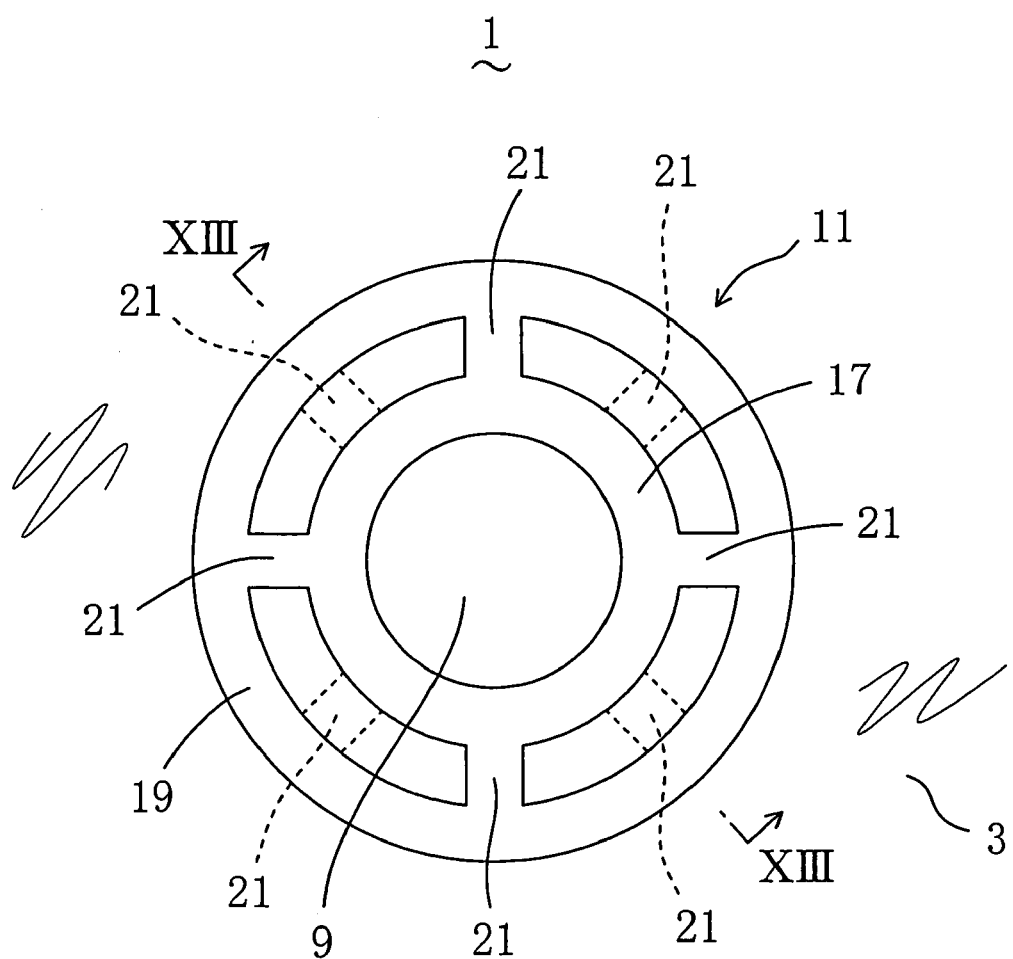
FIG. 14 is a view corresponding to FIG. 2 in Embodiment 5.
Figure 15:
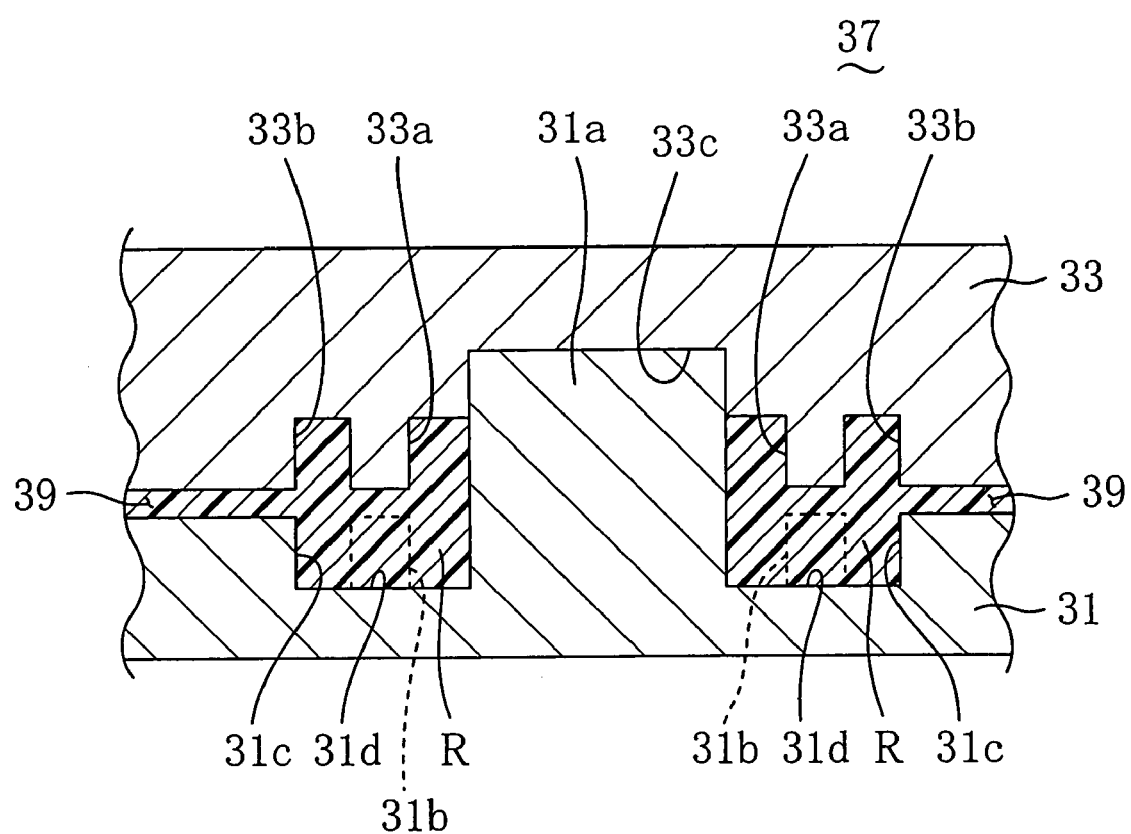
FIG. 15 is a view (corresponding to FIG. 4) illustrating a molding step at a part corresponding to the section taken along the line XIII-XIII in FIG. 14 and shows the state where a fiber-containing thermoplastic resin is injected and filled in a cavity of a mold in Embodiment 5.
Figure 16:
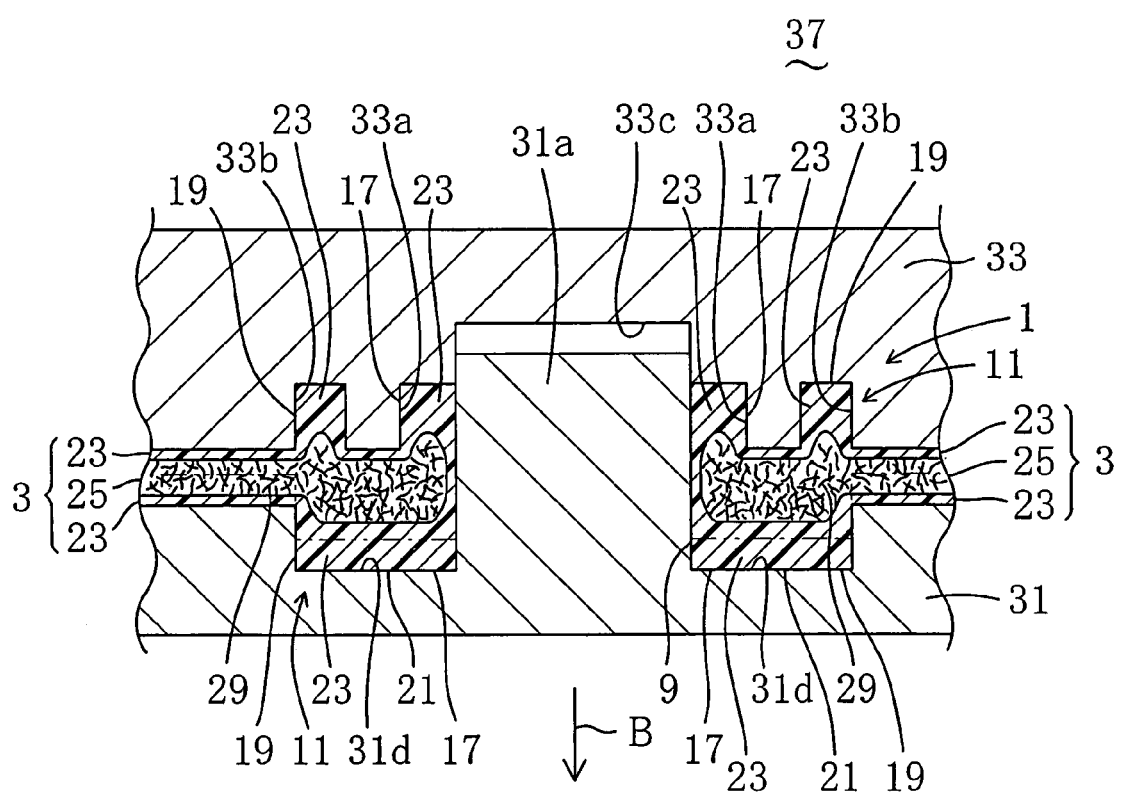
FIG. 16 is a view (corresponding to FIG. 5) illustrating a molding step at a part corresponding to the section taken along the line XIII-XIII in FIG. 14 and shows the state where the door inner panel is formed by slightly withdrawing and moving a first die in a direction in which a cavity capacity is expanded in Embodiment 5.

FIG. 13 and FIG. 14, which corresponds to FIG. 1 and FIG. 2, respectively, shows a door inner panel 1 as a resin molded article according to Embodiment 5, and FIG. 15 and FIG. 16 show molding steps corresponding to those of FIG. 4 and FIG. 5, respectively.

In Embodiment 5, mount bases 11 are protruded from the respective faces of a panel main body 3 so as to share a through hole 9, wherein joint mount base portions 21 of the mount bases 11 are arranged so as not to be overlapped with each other when viewed in plan.

Referring to a mold 37 used in Embodiment 5, a first die 31 having a convex portion 31a serves as a movable die while a second die 33 having concave portions 33a, 33b, 33c serves as a fixed die in contrast to that in Embodiment 5. Accordingly, in Embodiment 5, the first die 31 is withdrawn and moved in the direction B in which the cavity capacity is increased in the process of solidifying a fiber-containing thermoplastic resin R in a cavity 39 of the mold 37.

Further, the concave portions 31b, 31c are formed in the first die 1 correspondingly to the protrusion of the mount bases 11 at the respective faces of the panel main body 3, as well as the concave portions 33a, 33b formed in the second die 33, wherein the sectional form of the first die 31 are different from that of the second die 33 in FIG. 15 and FIG. 16 because, as described above, the joint mount base portions 21 of the mount bases 11 are arranged so as not to be overlapped with each other when viewed in plan. Reference numeral 31d in FIG. 15 and FIG. 16 denotes a concave portion corresponding to the joint mount base portion 21. As shown in FIG. 13, the sectional forms at the respective sides of the panel main body 3 are different from each other.

The other part has the same structure as that in Embodiment 4, and therefore, detailed description thereof is omitted with the same reference numerals assigned to the same constitutional elements. Description of a molding method thereof is also omitted.

Hence, the same effects as in Embodiment 4 can be obtained in Embodiment 5.

In addition, in Embodiment 5, the protrusion of the mount bases 11 from the respective faces of the panel main body 3 increases double the thickness in total of the skin layers 23, thereby increasing the rigidity of the mount bases 11.

Moreover, in Embodiment 5, the joint mount base portions 21 provided at the respective faces of the panel main body 3 are not overlapped with each other when viewed in plan to increase parts that receive the fastening force of the bolt 43, thereby contemplating a further increase in rigidity of the mount bases 11.

It is noted that the joint mount base portion 21 of each mount base 11 has four parts in each of the above embodiments, but may have two, three, five or more parts.

In Embodiment 2, thought the mount bases 11 are protruded from the respective faces of the panel main body 3 so that respective joint mount base portions 21 are overlapped with each other when viewed in plan, the joint mount base portions 21 may not be overlapped with each other when viewed in plan as in Embodiment 5. By doing so, parts that receive the fastening force of the bolt 43 increase, thereby contemplating a further increase in rigidity of the mount bases 11. Conversely, in Embodiment 5, the respective joint mount base portions 21 may be overlapped with each other when viewed in plan as in Embodiment 2. By doing so, the thickness in total of the joint mount base portions 21 increases double to increase the rigidity of the mount bases 11 further.

Furthermore, though each mount base 11 is continuous so as to form an annular shape in each of the above embodiments, each mount base 11 may be cut at some midpoint thereof only if each mount base 11 forms a ring shape in combination as a whole. The solid layer 27 of the panel main body 3 around the outer periphery of each mount base 11 may also be cut at some midpoint thereof in Embodiment 3. Further, the solid layer 27 is applicable to the door inner panel 1 in which the mount bases 11 are protruded from the respective faces of the panel main body 3 as in Embodiment 2. Each mount base 11 may have a triple structure or more, wherein the second and following mount base portions counted from the inner side are called outer mount base portions.

In addition, in each of the above embodiments, though the washers 45 are made in contact with the inner mount base portion 17 or the joint mount base portion 21 so that the inner mount base portion 17 and the joint mount base portion 21 receive the fastening force of the bolt 43, the washers 45 may be in contact with the outer mount base portion 19 as well so that the entirety of each mount base 11 receives the fastening force of the bolt 43.

Further, the pores are formed inside the panel main body 3 by utilizing the springback phenomenon of the fiber 29 in each of the above embodiments. While, in the case using a fiber-reinforce thermoplastic resin R containing a foaming agent, even if the restoring force of the fiber 29 would be short in the springback phenomenon when the movable die is withdrawn and moved largely for increasing the thickness of the panel main body 3 in the direction in which the movable die is withdrawn, the foaming force of the foaming agent complements the short restoring force of the fiber 29 to form pores reliably and favorably. The foaming agent to be used includes chemical forming agents that cause a chemical reaction for generating a gas, physical foaming agents using an inert gas, such as a carbon dioxide gas, a nitride gas, or the like, and the like.

The door inner panel 1 of a side door for an automobile is exemplified as the resin molded article in each of the above embodiments, but the present invention is applicable to any other automotive panels and any panels for an article other than an automobile.

The first die 31 and the second die 33 are used as the fixed die and the movable die, respectively, in each of Embodiments 1 to 4, but the first die 31 and the second die 33 may be used as the movable die and the fixed die, respectively, as in Embodiment 5. To do so, the pressure block 35 is provided on the first die 31 side.

Conversely, the first die 31 and the second die 33 are used as the movable die and the fixed die, respectively, in Embodiment 5, but the first die 31 and the second die 33 may be used as the fixed die and the movable die, respectively, as in Embodiments 1 to 4.

INDUSTRIAL APPLICABILITY

The present invention is useful for a resin molded article in which a protruded mount base is integrally formed with a molded main body, at the surface of which a hard skin layer with no pore is formed, and inside of which an expanded layer having a large number of pores is formed and for a molding method thereof.

The invention claimed is:

1. A resin molded article in a panel shape including a hard skin layer with no pore at an entire surface thereof and an expanded layer with a large number of pores inside thereof, and is made of a fiber-containing thermoplastic resin, the resin molded article comprising:
   a molded main body in which a through hole is formed; and
   an annular mount base continuously protruded from at least one face of the molded main body around the periphery of the through hole so as to surround the through hole,
   wherein the mount base includes an inner mount base portion including an inner peripheral face of the through hole, an outer mount base portion provided so as to surround the inner mount base portion outside the inner mount base portion with a space left, and a joint mount base portion having a plurality of parts for joining the inner mount base portion and the outer mount base portion, each of the inner mount base portion and the outer mount base portion has an annular shape, the inner mount base portion and the outer mount base portion are arranged such that the through hole is deposited in the center of the inner mount base portion and the outer mount base portion to surround the through hole, and
   the mount base and a part of the molded main body other than a joint mount base portion located between the inner mount base portion and the outer mount base portion of the mount base are formed of a solid layer having no expanded layer.

2. The resin molded article of claim 1,
   wherein another mount base is provided so that the mount bases are protruded from respective faces of the molded main body and the one inner mount base portion protruded from one surface of the molded main body is opposed to the other inner mount base portion protruded from the other surface of the molded main body, and the one outer mount base portion protruded from one surface of the molded main body is opposed to the other outer mount base portion protruded from the other surface of the molded main body.

3. The resin molded article of claim 1 or 2,
   wherein a solid layer having a predetermined width and having no expanded layer is formed at a part of the molded main body around the outer periphery of each mount base.

4. A resin molded article in a panel shape including a hard skin layer with no pore at an entire surface thereof and an expanded layer with a large number of pores inside thereof, and is made of a fiber-containing thermoplastic resin, the resin molded article comprising:
   a molded main body in which a through hole is formed; and
   an annular mount base continuously protruded from at least one face of the molded main body around the periphery of the through hole so as to surround the through hole,
   wherein the mount base includes an inner mount base portion including an inner peripheral face of the through hole, an outer mount base portion provided so as to surround the inner mount base portion outside the inner mount base portion with a space left, and a joint mount base portion having a plurality of parts for joining the inner mount base portion and the outer mount base portion,
   each of the inner mount base portion and the outer mount base portion has an annular shape and the inner mount base portion, the outer mount base portion are arranged such that the through hole is deposited in the center of the inner mount base portion and the outer mount base portion to surround the hole, and
   the skin layer at the mount base has a thickness larger than the skin layer at the molded main body.

5. The resin molded article of claim 4,
   wherein another mount base is provided so that the mount bases protruded from respective faces of the molded main body around the thorough hole as a center, and a position of the joint mount base portion in the one surface of the mount base is different from a position of the joint mount base portion in the other surface of the mount base in a circumferential direction of the through holes.

* * * * *